(12) United States Patent
Braun (10) Patent No.: US 12,402,741 B2
(45) Date of Patent: Sep. 2, 2025

(54) PLANT MILK AND JUICE STRAINER

(71) Applicant: Gabriel Braun, Jacksonville, FL (US)

(72) Inventor: Gabriel Braun, Jacksonville, FL (US)

( * ) Notice: Subject to any disclaimer, the term of this patent is extended or adjusted under 35 U.S.C. 154(b) by 435 days.

(21) Appl. No.: 17/975,659

(22) Filed: Oct. 28, 2022

(65) Prior Publication Data

US 2024/0138610 A1 May 2, 2024

(51) Int. Cl.
*A47J 19/00* (2006.01)
*A47J 19/02* (2006.01)

(52) U.S. Cl.
CPC ............. *A47J 19/005* (2013.01); *A47J 19/02* (2013.01)

(58) Field of Classification Search
CPC ........ A47J 19/005; A47J 19/023; A47J 19/06; A47J 31/0636
USPC .......................................... 99/297, 298, 302
See application file for complete search history.

(56) References Cited

U.S. PATENT DOCUMENTS

| | | | | |
|---|---|---|---|---|
| 4,003,522 A | * | 1/1977 | Buckley | A47J 43/22 241/199.9 |
| 6,135,019 A | * | 10/2000 | Chou | A47J 43/0716 366/205 |
| 2012/0216682 A1 | * | 8/2012 | Bodum | A47J 31/20 99/298 |
| 2020/0323378 A1 | * | 10/2020 | Patel | B01D 29/13 |
| 2021/0030193 A1 | * | 2/2021 | Rivera | A47J 31/0636 |

FOREIGN PATENT DOCUMENTS

CN        101617795 A   *   1/2010
CN        208491681 U   *   2/2019

\* cited by examiner

*Primary Examiner* — Christopher L Templeton
*Assistant Examiner* — P Derek Pressley (57) ABSTRACT

A multi-purpose strainer for homemade production of plant-based milk, fruit, or vegetable juices is disclosed. According to one embodiment, the strainer for plant milk and juice, comprising, a container having a base, an upright wall extending over the base from the periphery defining a hollow cavity, and an opening at a top of the container, one or more sieves mounted over the opening of the container, one or more mesh filters configured within each of the one or more sieves, and at least one pressing member. One or more sieves are hollow cylinders having a wall of different heights and a supporting ledge extending out from an inner surface at a bottom edge of the wall to hold the mesh filter within the sieves.

14 Claims, 8 Drawing Sheets

PLANT MILK AND JUICE STRAINER

FIELD OF INVENTION

The invention relates to a food-straining device. More particularly, it is an easy assembling, multi-purpose strainer to filter out the milk or juice from the pulp mix of any fruit, vegetable, or nut.

BACKGROUND

Plant-based or non-dairy milk alternative is the fast-growing segment in the newer food product development category of functional and specialty beverages across the globe. Nowadays, cow milk allergy, lactose intolerance, antibiotics concern, the prevalence of hypercholesterolemia, and more preference for vegan diets have influenced consumers towards choosing cow milk alternatives. Plant-based milk alternatives are a rising trend. Though numerous types of innovative food beverages from plant sources are being exploited for a cow milk alternative, many of these faces some type of technological issues; either related to making or processing.

Therefore, there exists a need for a compact yet efficient manual food-straining device capable of being used for preparing plant-based milk anywhere. Further, there exists a need for a compact multi-tier food strainer that is capable of being assembled or disassembled based on straining needs and allows easy cleaning and storage.

OBJECT AND SUMMARY

This summary is provided to introduce a selection of concepts in a simplified form that is further disclosed in a brief description of the invention. This summary is not intended to identify key or essential inventive concepts of the claimed subject matter, nor is it intended for determining the scope of the claimed subject matter.

The present disclosure provides an easy assembling, multi-purpose filter or manual plant food strainer to filter out the milk or juice from the pulp of any fruit, vegetable, nuts or beans, etc. According to an aspect of the present disclosure, the strainer for plant milk and juice comprises a container having a base, an upright wall extending over the base from the periphery defining a hollow cavity, and an opening at a top of the container, one or more sieves placed over the opening of the container, one or more mesh filter configured within each sieve of the one or more sieves, and at least one pressing member.

According to one embodiment, the container of the strainer for plant milk or juice of the present invention is of any shape having a base and a wall extending upright or at an angle from the periphery of the base defining a hollow cavity and an open at a top of the container for pouring and storage of any liquid. In an embodiment, the container is a pitcher or a jar. In an embodiment, the container comprises a handle coupled to the outer surface of the extending wall of the container and a removable lid mounted on the top opening of the container.

In an embodiment, the strainer further comprises one or more sieves mounted over the opening of the container and one or more mesh filters configured within each of the one or more sieves. One or more sieves have upright walls of different heights and one or more mesh members have different mesh numbers or mesh sizes provided for being used according to the liquid profile of the food being filtered or strained. In an embodiment, the strainer includes at least one pressing member provided for pressing the blended pulp of food such as fruits, vegetables, nuts, etc. against the mesh filter configured within the sieve for press separating the milk or juice from the pulp. In an embodiment, the strainer further includes a filter skirt that may be configured over the container to hold one or more sieves and one or more mesh filters configured within the sieves while using the different-sized strainer.

According to one embodiment, the strainer of the present invention is capable of being used for multiple functions or places where filtering is necessary. For instance, the strainer of the present invention may be used to make nut milk, soy milk, yogurt, or vegetable and fruit juice. Further, the food strainer of the present invention is capable of being used as a tea filter or for any other filtering requirement. For instance, the food strainer of the present invention may be used to make plant milk from nuts, seeds, beans, and grains, or juices from vegetables and fruits. Further, the food strainer of the present invention is capable of being used as a tea filter, yogurt strainer, or for any food filtering requirement. According to one embodiment, the plant ingredients are first blended using a blender or food processor with quantities based on existing liquid-originating composition to create a hydrated stainable mixture from which the fluid is extracted using the present food strainer.

One object of the present invention is to provide a multi-purpose food strainer for the purpose of making homemade plant-based milk and juices without any requirement of complex milking or juicing devices or preventing wastage because of the use of traditional methods of separating milk and juice from plant ingredients.

One more object of the present invention is to provide a multi-purpose food strainer for producing homemade plant-based milk and drinks effortlessly without the worry of harmful chemical additives used in commercial processes.

One more object of the present invention is to provide a multi-purpose food strainer that overcomes the limitations and drawbacks of traditional strainers and nut bags which are clumsy, messy, and less optimum while preparing plant-based milk and juices.

One more object of the present invention is to provide a multi-purpose food strainer that is stackable for multi-tier straining and detachable to allow easy cleaning of each part of the strainer after use and easy replacement if worn or broken.

According to one embodiment, the food strainer of the present invention includes filter sieves of different heights which to accommodate different volumes of mixtures. The filter sieves are hollow cylinders of different heights having openings at both ends. The mesh filter is placed at the bottom opening as a filtering closure of the filter sieve, forming a tubular cavity with a mesh filter detachably attached at one end and an opening at the opposite end. According to one embodiment, said filter sieve arrangement stacks over the container which collects the liquid separating from the pulp mix. In an embodiment, the filter skirt is used for stacking the filter sieve over the container.

According to one embodiment, a pulp mix of a plant ingredient is poured into the filter sieve within the tubular cavity and manually pressed or sifted by the user using at least one of the pressing members depending on the profile of the food to extract as much milk or juice from the pulp as possible. According to one embodiment, the strainer is provided with a plurality of removable mesh filters of various mesh sizes to facilitate the user to use the same strainer for multiple purposes by simply changing the mesh filter.

According to one embodiment, each mesh filter is made of a wire mesh or fabric mesh mounted on a circular frame having a central support design to prevent the mesh filter from any damage while pressing the mix against the mesh filter to separate milk/juice. According to one embodiment, the frame is detachable with the wire mesh or fabric mesh allowing multiple meshes to get attached over a mesh frame according to requirement. The mesh frame according to one embodiment includes a locking mechanism to configure and lock the wire or fabric mesh over the frame to make a mesh filter. According to one embodiment, multiple pressing members of various pressing embodiments, i.e. flat press, mesh press, and air press are provided to press different mixtures depending on their profile to separate pulp particles from liquid. The outer rim of the mesh frame has a flexible rubber buffer. The rubber buffer creates a seal against the inside of the sieve enabling only liquid to pass through the mesh area.

According to one embodiment, the food strainer is capable of multi-stacking where more than one filter sieves having mesh filters may be stacked over the pitcher to form a multi-tier filtering arrangement of same or different sized mesh filters to completely filter out desired level pulp particles from the extracted fluid. According to one embodiment, each pressing member includes an upright member with a horizontal handle member configured at the top of the upright member to allow the user to easily grip and hold the pressing member while pressing the pulp against the mesh filter.

According to one embodiment, the container includes a handle extending out of the outer surface of the extending walls of the container to allow the user to hold the container during pressing, to avoid movement of the container. According to one embodiment, each of one or more sieves also includes a handle member outwardly extending from both sides of the top portion of the sieve for easy stacking and un-stacking of the sieve over the container or other sieves.

BRIEF DESCRIPTION OF DRAWINGS

The foregoing summary, as well as the following detailed description of the invention, is better understood when read in conjunction with the appended drawings. For the purpose of merely illustrating the invention, exemplary constructions of the invention are shown in the drawings. However, the invention is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION OF INVENTION

The present invention overcomes the aforesaid drawbacks of the above and other objects, features, and advantages of the present invention will now be described in greater detail. Also, the following description includes various specific details that are to be regarded as merely exemplary. Accordingly, those of ordinary skill in the art will recognize that: without departing from the scope and spirit of the present disclosure various embodiments may be various changes and modifications described herein.

The present invention provides a multi-tier or multi-level strainer for the production of home-made plant-based milk, vegetable, or fruit juices, for filtering tea or yogurt, or for being used as a filter where filtering is required. According to one embodiment, the plant ingredients or food is first blended using any conventional blender or food processor with quantities of liquid based on existing liquid-originating composition to create a hydrated stainable pulp mix and the strained fluid or liquid from the pulp mix may be plant milk or a vegetable or fruit juice. According to one embodiment, the food strainer of the present invention for filtering out fluid from said blended pulp mix comprises a container that works as a base of the present food strainer to collect and store the fluid filtered or extracted by the strainer. One or more sieves of different embodiments are provided, each of which is capable of being configured over the container detachably, to hold the pulp mix during the extraction or filtration of fluid from the pulp mix of the blended plant food ingredients such as nuts, fruits or vegetables, etc.

According to one embodiment, each of one or more sieves includes a support ledge extending out from the inner surface of the cylindrical-shaped sieve from the bottom edge to work as a guiding groove to hold the mesh filter or a mesh frame when placed within the filter sieve. According to one embodiment, the food strainer of the present invention further includes a plurality of mesh filters made of a mesh frame and detachable mesh members having different amounts and sized holes to allow users to elect anyone based on the property of the pulp mix and the fluid being extracted from the said pulp mix.

According to one embodiment, the mesh filter when set over the support ledge within the cylindrical sieve separating the container and the sieve, thus forms two separate chambers, one within the container to collect and hold the extracted fluid, and another above the mesh filter within the sieve which serves as a chamber for pouring the blended plant food mixture from which the liquid needs to be filtered out.

In one another embodiment, the food strainer comprises a filter skirt capable of being configured between the container and the cylindrical sieve to hold mesh filters during straining.

According to one embodiment, a plurality of different embodiment of pressing members are provided such as a flat press, mesh press, air press, etc. to press the blended plant food mixture against the mesh filter when the pulp mix is poured under the filter sieve to separate the liquid from the mix and to filter out and collect within the container provided at bottom of the strainer. Various embodiments of the pressing members are provided to allow users to select any one of them depending on the nature and property of the food from which the liquid is being extracted.

Figure 1:
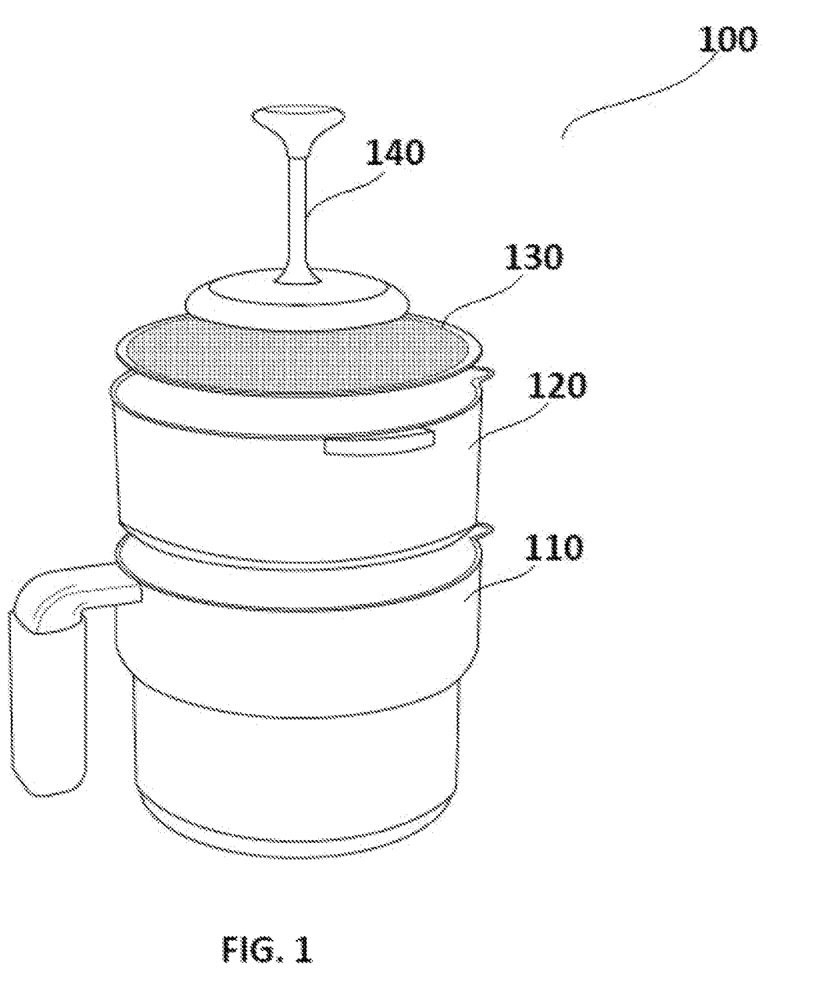
FIG. 1 illustrates a view of one exemplary embodiment of the strainer for plant milk and juice, according to the present invention.

Referring to FIG. 1 now which illustrates a view of one exemplary embodiment of the strainer 100 for plant milk and juice. According to the present embodiment, the strainer 100 is capable of being assembled when needed or disassemble after use to allow easy cleaning, storage, and replacement of each removable part of the present strainer 100. According to the present embodiment, the strainer 100 comprises a container 110 having a base, an upright wall extending over the base from the periphery defining a hollow cavity, and an opening at a top of the container provided to collect the extracted or filtered liquid from the food pulp. Further, one or more sieve 120 is mounted over the opening of container 110, and one or more mesh filter 130 is configured at the bottom of the filter sieve 120 which separates the sieve 120 from the container 110, creating two separate chambers one above the mesh filter 130 and one below which is the hollow cavity of the container 110. The mesh filter is made of a frame and a detachable mesh member that is either made of a wire or fabric.

According to the present embodiment, the mesh filter 130, once set within the sieve 120, forms a cavity within the sieve 120 with a wall of the sieve 120 defining a cavity with a top opening for pouring the blended pulp mix. Further, a pressing member 140 is provided to press, stir or sift the food pulp mix within the sieve 120 against the mesh filter 130 to separate the liquid from the pulp mix which eventually filters out through the mesh filter 130 and automatically gets collected within the container 110 because of the gravitational force.

Figure 2:
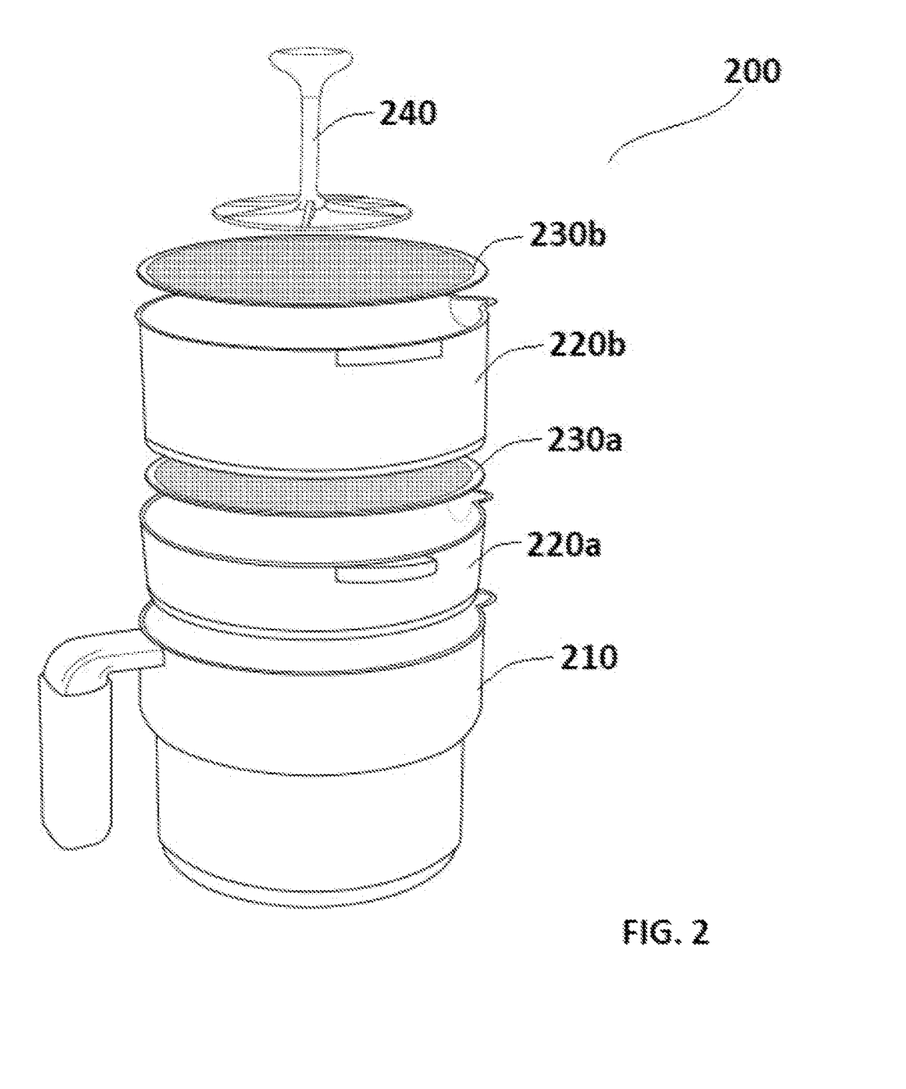
FIG. 2 shows one another embodiment of the strainer for plant milk and juice with a multi-tier arrangement, according to the present invention.

FIG. 2 shows another embodiment of the strainer 200 with a multi-tier arrangement. According to an embodiment, the strainer 200 of the present invention is capable of being made in a multi-tier arrangement for precise filtering, when required. The multi-tier or multi-story arrangement of the present strainer 200 allows double or multi-filtering of an extracted liquid, thus preventing even smaller particles of food to be present within the final filtered liquid, milk, or juice. In a single-story embodiment, because of the pressing of food against the mesh filter, there are chances of some food particles to pass from the mesh filter which can impact the texture (particle density) of the filtered liquid which can be reduced by the multi-layer arrangement, where more than one filter sieves with mesh filters are stacked. Multi-tier arrangement also prevents initial straining failure (liquid blocked from passing by particle size) by removing larger particles before proceeding to desired tier mesh size.

According to the present embodiment, the strainer 200 of the present invention includes two filtering sieves (220*a* and 220*b*) each of which has separate mesh filters (230*a* and 230*b*) configured within the sieves (220*a* and 220*b*). The filtering sieves (220*a* and 220*b*) are stacked over each other and mounted over the container 210. Further, a pressing member 240 is provided to allow the user to press the food mix within the first filtering sieve 220*b* to separate and filter out the liquid from the first mesh filter 230*b* which automatically falls and gets collected first into the second filter sieve 220*a* and further gets filtered by the second mesh filter 230*a* before entering into the container 210 thus filtering out even smallest food particles from the resulting fluid.

According to one embodiment, the food can be anything including nuts, seeds, vegetables, fruits or any other plant ingredients, etc., which are first blended using a blender or food processor with quantities of liquid based on existing liquid originating composition to create a hydrated stainable mixture and the strained mixture resulting fluid or liquid may be plant milk or a vegetable or fruit juice.

Figure 3:
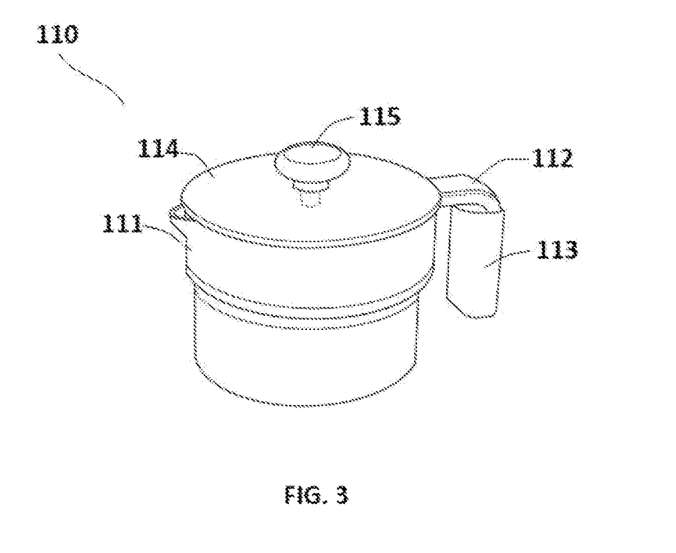
FIG. 3 shows a view of a container with a lid of the strainer for plant milk and juice, according to the present invention.

FIG. 3 shows a view of a container 110 of the present food strainer or a plant milk strainer with a lid 114. According to one embodiment, container 110 of the present invention is provided with a lid 114 which is detachable from container 110, thus allowing container 110 to be used during filtering. Also, lid 114 is provided to cover and safely store the filtered fluid within container 110. According to one embodiment, the pitcher 110 of the present invention comprising of a main body 111 having a handle 112 provided with a hand grip 113 to allow the user to easily hold the container 110 during the production of milk or juice or also to move the present strainer 100.

According to one embodiment, lid 114 is provided to be configured over the top opening of container 110 to close container 110. According to one embodiment, the lid 114 further includes a handle 115 extending out of the lid 114. The handle 115 is provided to allow the user to easily place the lid 114 over the container main body 111 or remove it from there.

Figure 4A:
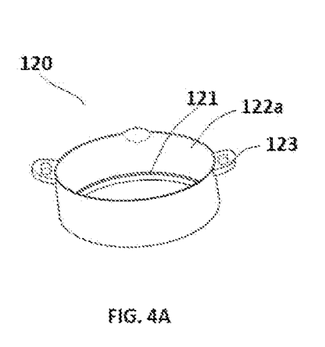
FIG. 4A shows one exemplary embodiment of a sieve of the strainer for plant milk and juice, according to the present invention.
Figure 4B:
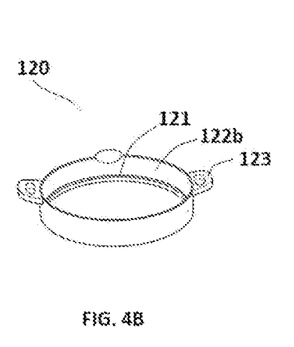
FIG. 4B show one another embodiment of a sieve of the strainer for plant milk and juice, according to the present invention.
Figure 4C:
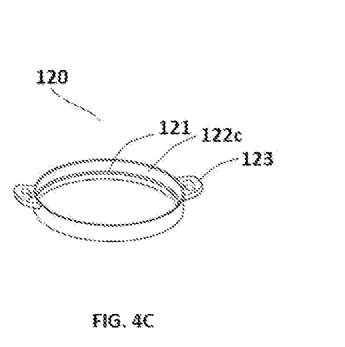
FIG. 4C show one more another exemplary embodiment of a sieve of the strainer for plant milk and juice, according to the present invention.

Referring to FIG. 4A, FIG. 4B and FIG. 4C which shows three different exemplary embodiments of filter sieve 120 of the present strainer 100. According to an embodiment, the filtering sieves 120 are hollow cylinders having openings at both ends. Further, the filtering sieves 120 comprises a support ledge 121 on an inner surface of the cylindrical wall (122*a*. 122*b*, and 122*c*) of each respective embodiment of filter sieve 120. The support ledge 121 is configured to extend out of the cylindrical wall (122*a*, 122*b* and 122*c*) from near the bottom opening. The support ledge 121 is provided to guide and hold the mesh filter 130 at the bottom of the filter sieve 120 when configured.

Further, each filter sieve 120 is provided with a pair of handles 123 mounted at the outer wall on the top of the filter sieve 120 which is provided to hold the sieve 120 to stack or unstack within the strainer 100.

Figure 5A:
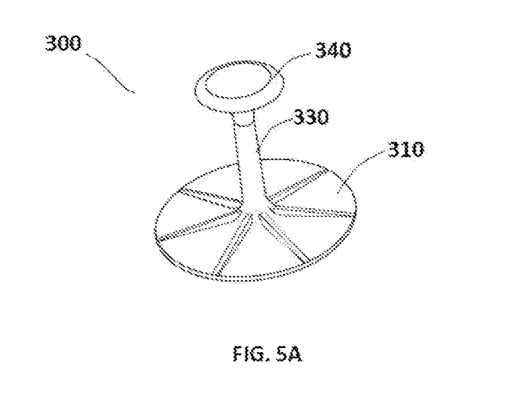
FIG. 5A shows a view of one exemplary embodiment of at least one pressing member, according to the present invention.

FIG. 5A shows a view of one exemplary embodiment of a presser or a pressing member 300 which is a flat press embodiment.

According to the present embodiment, at least one pressing member 300 is provided to press the blended mix against the mesh filter 130 manually by the user to separate the fluid from the pulp mix. The flat press embodiment shown in FIG. 5A includes a pressing plate 310 connected with a hand grip 340 through an upright member 330. The pressing plate 310 has evenly spread channel intersection in both directions. The channel enables the plate to directly contact the mesh surface without creating air pocket and enabling more pressure from raised channel walls. According to one embodiment, the hand grip 340 allows the user to hold the pressing member 300 in the palm of the hand and press the pressing plate 310 against the mesh filter 310.

Figure 5B:
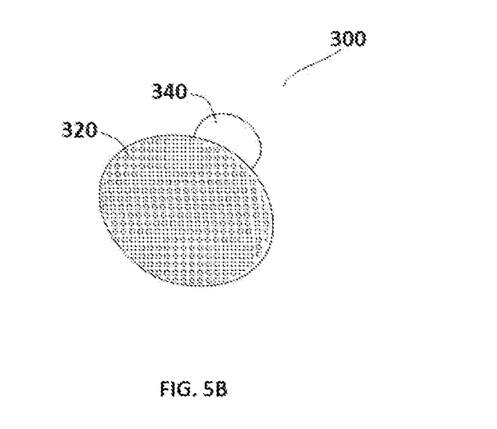
FIG. 5B shows the bottom view of the same exemplary embodiment of pressing member shown in FIG. 5A, according to the present invention.

FIG. 5B shows the bottom view of the same flat pressing member 300 shown in FIG. 5A, wherein the bottom surface 320 of the pressing plate 310 which comes in contact with the blended pulp mix when pressed using the presser 300 includes a plurality of raised members.

Figure 6:
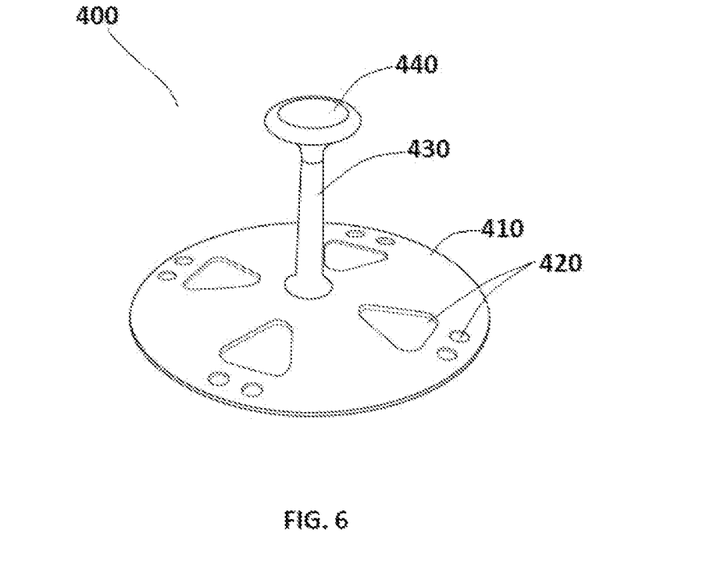
FIG. 6 shows one another exemplary embodiment of the pressing member, according to the present invention.

FIG. 6 shows one another exemplary embodiment of pressing member 400 of the present strainer 100.

According to the present embodiment, the pressing member 400 includes different embodiment or design of presser plate 410 while keeping other parts such as hand grip 440 and upright member 430 same as other embodiments. The mesh presser plate 410 attaches to any of the mesh filters 130 forming a combined mesh and press.

The mesh and press combination form an airtight seal when pressed inside the sieve 120. Pressing toward the mesh installed in the bottom of sieve 120 causes the liquid present within the pulp mix to be forced out through the mesh filter 130 present within sieve 120. This pressure leaves only dry pulp trapped between the two meshes. The mesh press is removed from sieve 120 so that liquid-free pulp can be retrieved from sieve 120. The mesh attachment to the mesh pressing member 400 can be implemented in variety of ways. According to the present embodiment, the presser plate 410 of the present mesh press 400 is a circular plate perforated with different shaped apertures.

Figure 7A:
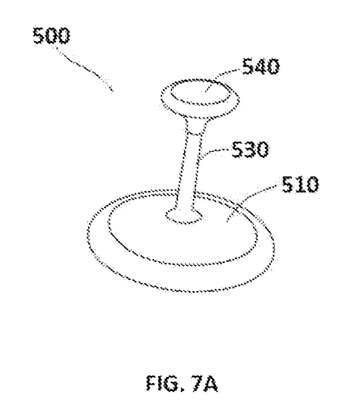
FIG. 7A shows one another exemplary embodiment of the pressing member, according to the present invention.
Figure 7B:
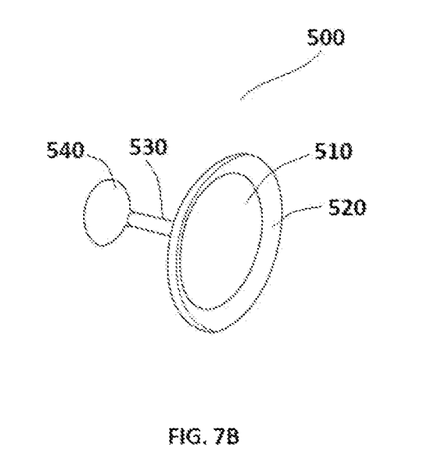
FIG. 7B shows an isometric view of the pressing member shown in FIG. 7A, according to the present invention.

Referring now to FIG. 7A and FIG. 7B which shows views of one another embodiment of the air pressing member 500 which is an air presser 500.

According to the present embodiment, the presser plate 510 of present air presser 500 is made in the shape of an inverse cup with an extending curved wall 520 which traps air to aid straining during press and once pressed, creates a vacuum to suck away the pulp mix from the mesh filter 130 making way for more liquid to flow through mesh filter 130 prior to and upon next pressing action.

According to one embodiment, each component of the present strainer is detachably attachable thus allowing the user to assemble the food strained when needed and disassemble it after used to easily clean and store with lesser space requirement for packaging.

Figure 8A:
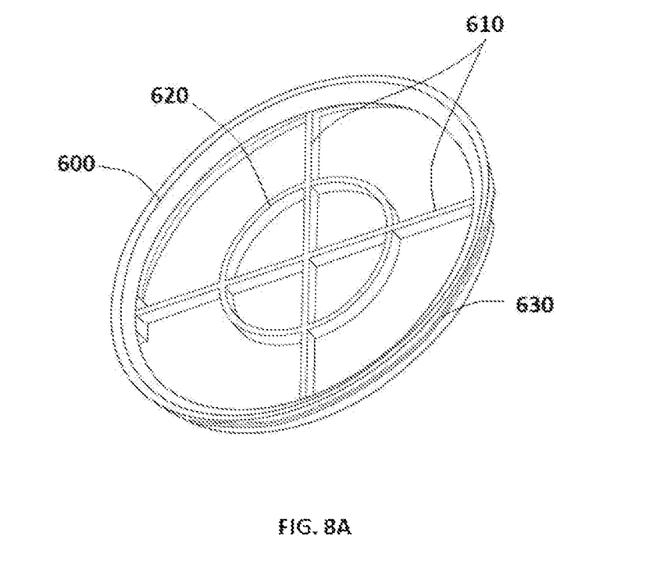
FIG. 8A shows a top view of the mesh frame which supports the wire or fabric mesh to form a mesh filter, according to the present invention.

FIG. 8A shows a top view of one exemplary embodiment of a mesh support frame 600 which is provided to support the wire or fabric mesh to form a complete mesh filter 130 that can be placed inside the sieve 120 during filtration. According to one embodiment, the mesh support frame 600 is provided separately from the mesh member to allow any type of mesh to get detachably attached over the mesh support frame 600 to form a mesh filter 130, thus avoiding separate mesh support frame 600 for each mesh member, wherein the mesh members may be any of wire mesh, fabric mesh or any other mesh with different number and size of perforation thus saving some additional components.

According to one exemplary embodiment, the mesh support frame 600 is a circular frame member or rim made of any material such as metal, plastic, or any other suitable rigid material. The mesh support frame 600 further includes two perpendicular arm members 610 intersecting at the centre of the circular outer rim and a concentric circular inner rim 620 with a smaller radius or periphery to the main circular outer rim 600 which creates a supportive frame for the configuration of mesh member to form a complete mesh filter.

Figure 9:
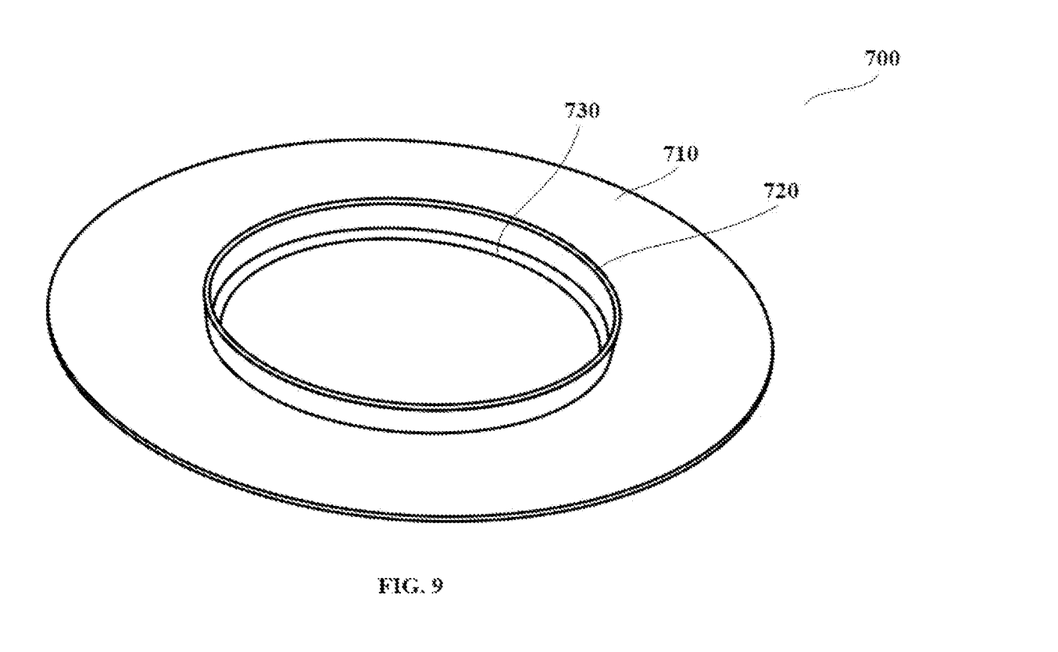
FIG. 9 shows a view of a filter skirt, according to the present invention.

FIG. 9 shows a view of a filter skirt 700, according to the present invention.

According to an embodiment, the strainer 100 comprises a filter skirt 700 to be configured between the container 110 and the filter sieve 120. The filter skirt 700 is configured to hold the mesh filter 130 between the container 110 and the filter sieve 120. The filter skirt 700 is a circular disk 710 with a circular aperture at the center. The circular aperture comprises an upright support member 720 on the periphery of the aperture. Further, the filter skirt 700 comprises a ledge 730 extending outward from the periphery of the circular aperture. The ledge 730 is provided to place and hold the mesh filter 130.

According to one embodiment, without departing from the scope of the present invention, various other embodiments of the mesh support may be made without any limitation. According to one embodiment, the mesh support frame may be a circular frame with a plurality of supporting members forming a cross pattern or any other geometrically possible pattern. According to one another exemplary embodiment, the mesh support frame is made without circular frame members and with a plurality of touch points which may be set over the support ledge within the sieve to hold the mesh member.

Figure 8B:
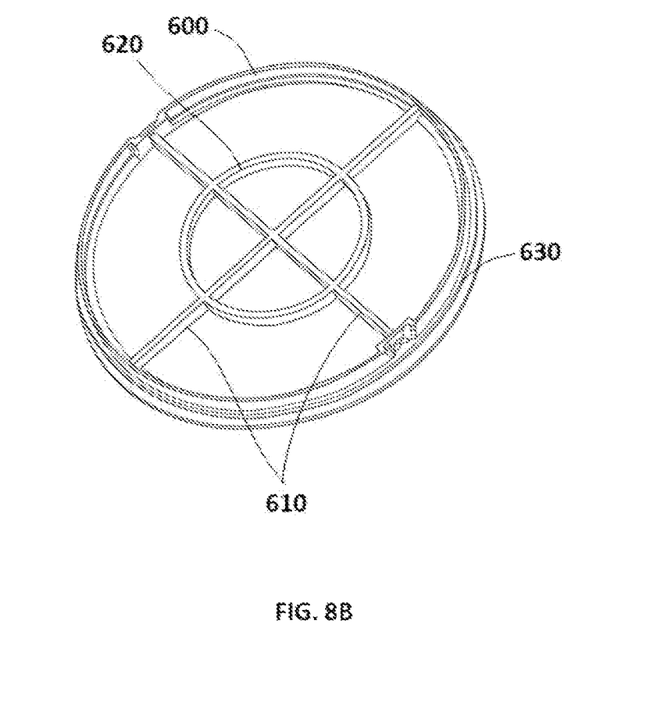
FIG. 8B shows the bottom view of the same mesh frame as shown in FIG. 8A, according to the present invention.

According to one embodiment, the outer surface of the main rim 600 further includes a rubber gasket 630 to properly seal the mesh filter when installed within the filter sieve thus preventing any leakage of fluid and/or food mixture from anywhere other than the mesh. While FIG. 8B shows the bottom view of the same mesh frame as shown in FIG. 8A.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A strainer for plant milk and juice, comprising:
   a container having a base, an upright wall extending over the base from a periphery defining a hollow cavity, and an opening at a top of the container;
   one or more sieves mounted over the opening of the container;
   one or more mesh filters configured within each of the one or more sieves,
   wherein
   the one or more mesh filters comprise a circular frame and a mesh member, the mesh member is detachably attached to the circular frame forming the mesh filter,
   the circular frame further comprises:
      a concentric outer rim and an inner rim connected using perpendicular arm members intersecting at a center of the concentric outer rim and the inner rim,
      a lock provided to lock the mesh member over the circular frame to form the mesh filter, and
      a flexible rubber buffer on an outer rim of the circular frame to create a seal when the mesh filter is set within the sieve; and
   at least one pressing member.

2. The strainer of claim 1, wherein the container further includes a handle mounted on an outer surface of the upright wall.

3. The strainer of claim 1, wherein the container further includes a removable lid placed on the opening of the container.

4. The strainer of claim 1, wherein the container is any of a jar or a pitcher.

5. The strainer of claim 1, wherein the one or more sieves are hollow cylinders having a wall of different heights.

6. The strainer of claim 5, wherein the one or more sieves further comprises a supporting ledge extending out from an inner surface of the wall at a bottom edge to work as a guiding groove and hold the mesh filter at the bottom edge of the sieve.

7. The strainer of claim 6, wherein the one or more sieves further comprises a handle outwardly extending from a side of a top portion of the one or more sieves.

8. The strainer of claim 1, wherein the mesh member is a wire mesh or a fabric mesh of different mesh numbers and different mesh sizes.

9. The strainer of claim 1, wherein the pressing member is any of a flat press, a mesh press, or an air press.

10. The strainer of claim 9, wherein the pressing member further comprises a pressing plate, a hand grip, and an upright member, the pressing plate is connected to the hand grip through the upright member.

11. A strainer for plant milk and juice, comprising:
a container having a base, an upright wall extending over the base from a periphery defining a hollow cavity, and an opening at a top of the container;
a first sieve mounted over the opening of the container;
a first mesh filter configured within the first sieve;
a second sieve mounted over the first sieve;
a second mesh filter configured within the second sieve; and
at least one pressing member, wherein
the first sieve and the second sieve are hollow cylinders having a wall of a same or a different height, and
the first sieve and the second sieve further comprises a supporting ledge extending out from an inner surface of the wall at a bottom edge of the first sieve and the second sieve to work as a guiding groove and hold the first mesh filter and the second mesh filter at the bottom edge of the first sieve and the second sieve respectively.

12. The strainer of claim 11, wherein the first mesh filter and the second mesh filter are made of a circular mesh frames and a mesh members of different mesh numbers and different mesh sizes, the mesh members are detachably attached to the circular frames forming the first mesh filter and the second mesh filter.

13. The strainer of claim 11, wherein the pressing member is any of a flat press, a mesh press, or an air press.

14. The strainer of claim 13, wherein the pressing member further comprises a pressing plate, a hand grip, and an upright member, the pressing plate is connected to the hand grip through the upright member.

* * * * *